United States Patent
Litvinov et al.

(10) Patent No.: US 6,656,613 B2
(45) Date of Patent: *Dec. 2, 2003

(54) MULTILAYER MAGNETIC RECORDING MEDIA WITH COLUMNAR MICROSTRUCTURE FOR IMPROVED EXCHANGE DECOUPLING

(75) Inventors: Dmitri Litvinov, Pittsburgh, PA (US); Sakhrat Khizroev, Pittsburgh, PA (US); James Kent Howard, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 100 days.

This patent is subject to a terminal disclaimer.

(21) Appl. No.: 09/965,182

(22) Filed: Sep. 27, 2001

(65) Prior Publication Data
US 2002/0037439 A1 Mar. 28, 2002

Related U.S. Application Data

(60) Provisional application No. 60/235,943, filed on Sep. 27, 2000.

(51) Int. Cl.[7] ............................. G11B 5/66; G11B 5/70; H01J 1/00; B32B 15/00; B32B 15/01
(52) U.S. Cl. .............................. 428/694 TM; 428/611; 428/632; 428/635; 428/668; 428/670; 428/672; 428/900
(58) Field of Search ................... 428/694 TM, 611, 428/632, 635, 670, 668, 672, 900

(56) References Cited

U.S. PATENT DOCUMENTS

| | | | | |
|---|---|---|---|---|
| 5,290,629 A | * | 3/1994 | Kobayashi et al. | 428/65.7 |
| 5,750,270 A | * | 5/1998 | Tang et al. | 428/611 |
| 5,834,085 A | * | 11/1998 | Lairson et al. | 428/65.3 |
| 5,989,728 A | * | 11/1999 | Coffey et al. | 428/611 |
| 6,331,364 B1 | * | 12/2001 | Baglin et al. | 428/694 T |
| 6,403,203 B2 | * | 6/2002 | Futamoto et al. | 428/212 |

OTHER PUBLICATIONS

U.S. patent application Ser. No. 09/816,815, Litvinov et al., filed Mar. 23, 2001.

* cited by examiner

Primary Examiner—Holly Rickman
(74) Attorney, Agent, or Firm—Alan G. Towner, Esq.; Pietragallo, Bosick & Gordon

(57) ABSTRACT

Materials including alternating magnetic layers and spacer layers for use as hard magnetic recording layers of magnetic recording media are disclosed. The spacer layers and the magnetic layers are treated in an oxygen-containing atmosphere in order to form oxidized boundary layers between adjacent granular columns extending through the layers. The columnar microstructure extends through the entire thickness of the multilayer structure to thereby exchange decouple the magnetic layers as well as the spacer layers. The spacer and magnetic layers may include additives which are present in grain boundary regions throughout the layers. The presence of the additives in the grain boundary regions may facilitate diffusion and oxidization between the adjacent granular columns. In a particular embodiment, the magnetic layers comprise Co, the spacer layers comprise Pd, and the additives comprise Cr, Pt, B, Ta, Nb or combinations thereof.

36 Claims, 3 Drawing Sheets

MULTILAYER MAGNETIC RECORDING MEDIA WITH COLUMNAR MICROSTRUCTURE FOR IMPROVED EXCHANGE DECOUPLING

CROSS REFERENCE TO RELATED APPLICATION

This application claims the benefit of U.S. Provisional Patent Application Ser. No. 60/235,943 filed Sep. 27, 2000.

FIELD OF THE INVENTION

The present invention relates to magnetic recording media, and more particularly relates to multilayer media having a columnar microstructure, which provides improved exchange decoupling and reduced noise.

BACKGROUND INFORMATION

Perpendicular magnetic recording systems have been developed for use in computer hard disc drives. A typical perpendicular recording head includes a trailing main pole, a leading return pole magnetically coupled to the main pole, and an electrically conductive magnetizing coil surrounding a yoke of the main pole. Conventional perpendicular recording media typically include a hard magnetic recording upperlayer and a soft magnetic underlayer, which provides a flux path from the trailing write pole to the leading return pole of the writer.

During recording operations, the perpendicular recording head is separated from the magnetic recording media by a distance known as the flying height. The magnetic recording media is moved past the recording head so that the recording head follows the tracks of the magnetic recording media, with the magnetic recording media first passing under the return pole and then passing under the main pole. Current is passed through the coil to create magnetic flux within the main pole. The magnetic flux passes from the main pole tip, through the hard magnetic recording track, into the soft underlayer, and across to the return pole.

One of the strongest candidates for perpendicular magnetic recording media includes a multilayer structure. Among the advantages of multilayers are easily adjusted anisotropy by varying the thickness of the layers in the bi-layer structure, and a remanence squareness equal to one, which ensures media with substantially no DC noise.

Multilayer-based perpendicular media is subject to a problem associated with conventional magnetic recording media. The magnetic grains must be exchange decoupled in order to improve signal-to-noise ratio (SNR). A typical multilayer recording structure comprises multiple repetitions of Co/Pt or Co/Pd bi-layers, which develop strong perpendicular anisotropy. The magnetic layers of the deposited films are granular, with each magnetic grain having a differing composition through its cross section. For these magnetic grains to be able to switch magnetization direction independently of each other, thus increasing SNR, they should be exchange decoupled.

A solution to this problem has been suggested recently by adding elements such as chromium to a magnetic layer such as Co in the bi-layer structure. Although this approach may help to exchange decouple the magnetic Co grains to some extent, since the non-magnetic Pt and Pd used in the spacer layers are highly polarizable elements, the exchange coupling will persist through the Pd or Pd spacer layers.

The present invention has been developed in view of the foregoing, and to address other deficiencies of the prior art.

SUMMARY OF THE INVENTION

The present invention effectively exchange decouples grains throughout a multilayer magnetic recording film. The multilayer film may be used as the hard magnetic recording film of a perpendicular magnetic recording medium. Although use of the present multilayer structures in perpendicular magnetic recording media is primarily described herein, it is to be understood that the present multilayer films may be used in other applications such as longitudinal magnetic recording media.

The multilayer film comprises alternating magnetic layers and nonmagnetic spacer layers. After deposition of the multilayers, the layers are exposed to an oxygen-containing atmosphere. The resultant multilayer film has a microstructure including granular columns. As used herein the term "granular columns" means crystalline grains which are generally aligned from layer-to-layer throughout substantially the entire thickness of the multilayer film. The granular columns extend in a direction substantially normal to the plane of the film. Within a particular column, the crystal structure of each magnetic layer and spacer layer may comprise a single grain, or may comprise multiple grains. The granular columns are separated by boundary layers which may be of lower density than the material of the granular columns.

During the oxygen treatment process, oxygen diffuses along the exterior of the columns and effectively exchange decouples the adjacent granular columns. The diffusion process may be accelerated through the use of elevated temperatures. In accordance with an embodiment of the present invention, additives such as B, Cr, $SiO_2$ and the like may be added to the magnetic layers and the spacer layers. The additives may increase oxygen diffusion rates and increase oxidation in the boundary regions between adjacent granular columns. Such additives not only control exchange coupling between the granular columns, but also provide a mechanism to control the grain size.

An aspect of the present invention is to provide a magnetic recording media including a substrate and a hard magnetic recording film on the substrate comprising alternating layers of magnetic material and spacer material. The magnetic material and spacer material comprise a microstructure including granular columns separated by oxidized boundary layers.

Another aspect of the present invention is to provide an exchange decoupled magnetic recording film including alternating layers of magnetic material and spacer material. The magnetic material and spacer material comprise a microstructure including granular columns separated by oxidized boundary layers.

A further aspect of the present invention is to provide a method of making a magnetic recording film. The method includes the steps of depositing alternating layers of magnetic material and spacer material and treating the layers in an oxygen-containing atmosphere to produce oxidized boundary layers between granular columns of the layers.

These and other aspects of the present invention will be more apparent from the following description.

DETAILED DESCRIPTION

Figure 1:
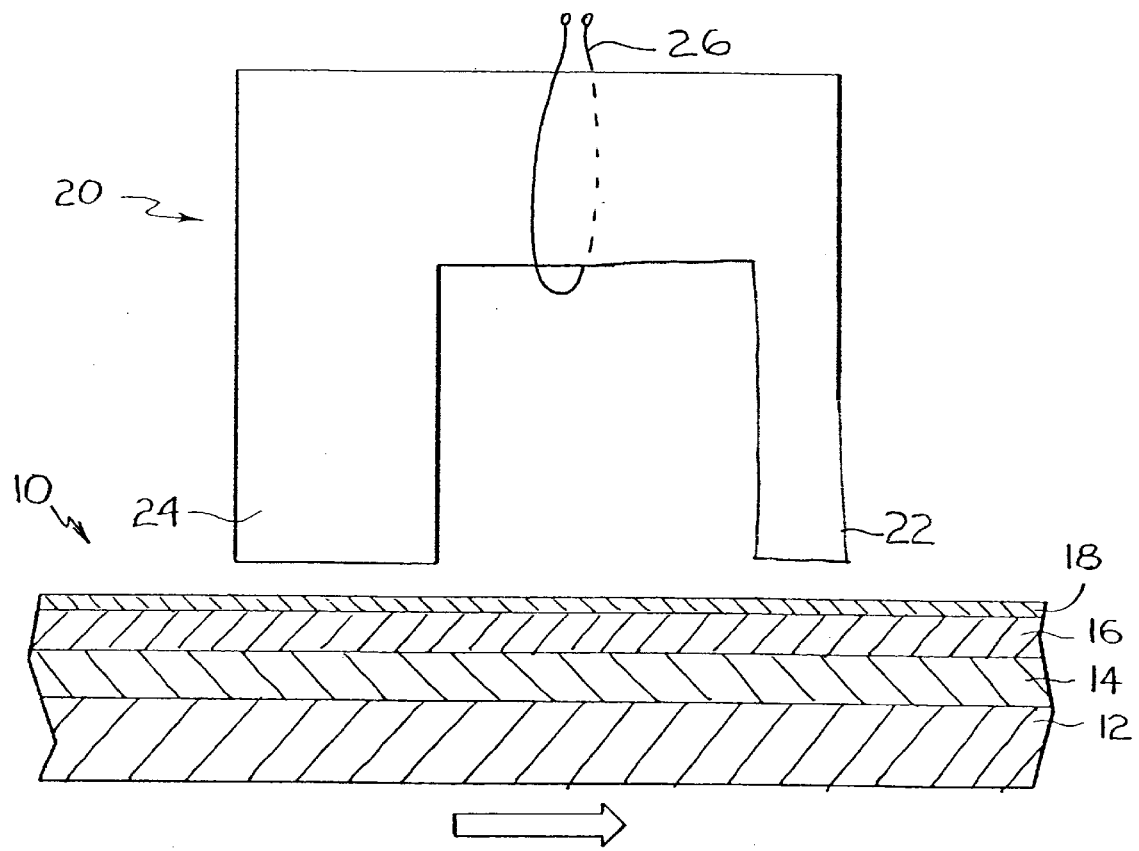
FIG. 1 is a partially schematic side sectional view of a perpendicular magnetic recording head and perpendicular magnetic recording medium. The recording medium includes a hard magnetic recording layer comprising a multilayer structure in accordance with the present invention.

FIG. 1 is a partially schematic side sectional view of a perpendicular magnetic recording medium 10. The medium 10 includes a substrate 12, which may be made of any suitable material such as ceramic glass, amorphous glass or NiP plated AlMg. A magnetically soft underlayer 14 is deposited on the substrate 12. Suitable soft magnetic materials for the underlayer 14 include CoFe and alloys thereof, FeAlN, NiFe, CoZrNb and FeTaN, with CoFe and FeAlN being typical soft materials. A magnetically hard recording film 16 comprising a multilayer structure of the present invention is deposited on the soft underlayer 14. A conventional magnetic exchange decouple layer (not shown) may be provided between the layers 14 and 16. A protective overcoat 18 such as diamond-like carbon may be applied over the recording film 16.

FIG. 1 also illustrates a perpendicular recording head 20 positioned above the magnetic recording medium 10. The recording head 20 includes a main pole 22 and an opposing pole 24. A coil 26 surrounds a yoke of the main pole 22. During recording operations, magnetic flux is directed from the main pole 22 perpendicularly through the recording film 16, then in the plane of the soft underlayer 14 back to the opposing pole 24.

In accordance with an embodiment of the present invention, the recording film 16 comprises a multilayer structure including alternating layers of magnetic material and non-magnetic spacer material. Both the magnetic layers and the spacer layers are exchange decoupled throughout the thickness of the film. As used herein, the term "exchange decoupled" means a material in which quantum mechanical exchange coupling between adjacent grains or columns is reduced. The term "magnetic layer" means a layer made of ferromagnetic material. The term "spacer layer" means a layer comprising a substantially non-ferromagnetic material.

Figure 2:
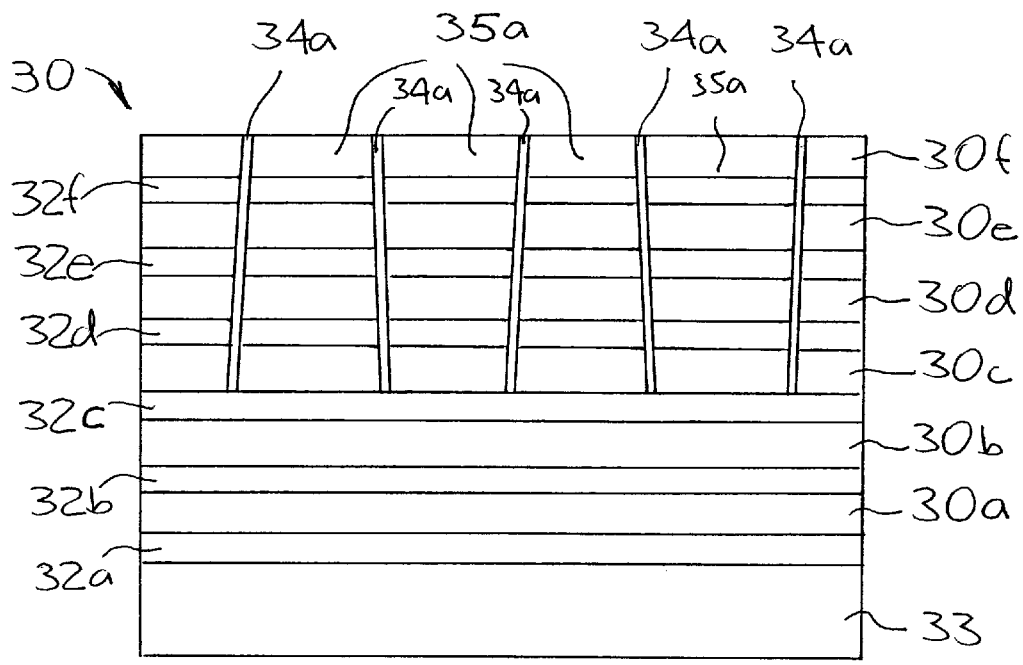
FIG. 2 is a partially schematic side sectional view of alternating magnetic layers and spacer layers deposited on a substrate. The deposited layers near the upper surface of the structure are exchange decoupled, but the deposited layers adjacent the substrate are not exchange decoupled.

FIG. 2 illustrates a multilayer structure 30 comprising alternating layers of magnetic material 30a–30f and spacer material 32a–32f deposited on a substrate 33. The deposited layers 30a–30f and 32a–32f include grain boundary regions 34a which form partially decoupled granular columns 35a. The columns 35a do not extend through all of the magnetic and spacer layers down to the substrate 33.

Figure 3:
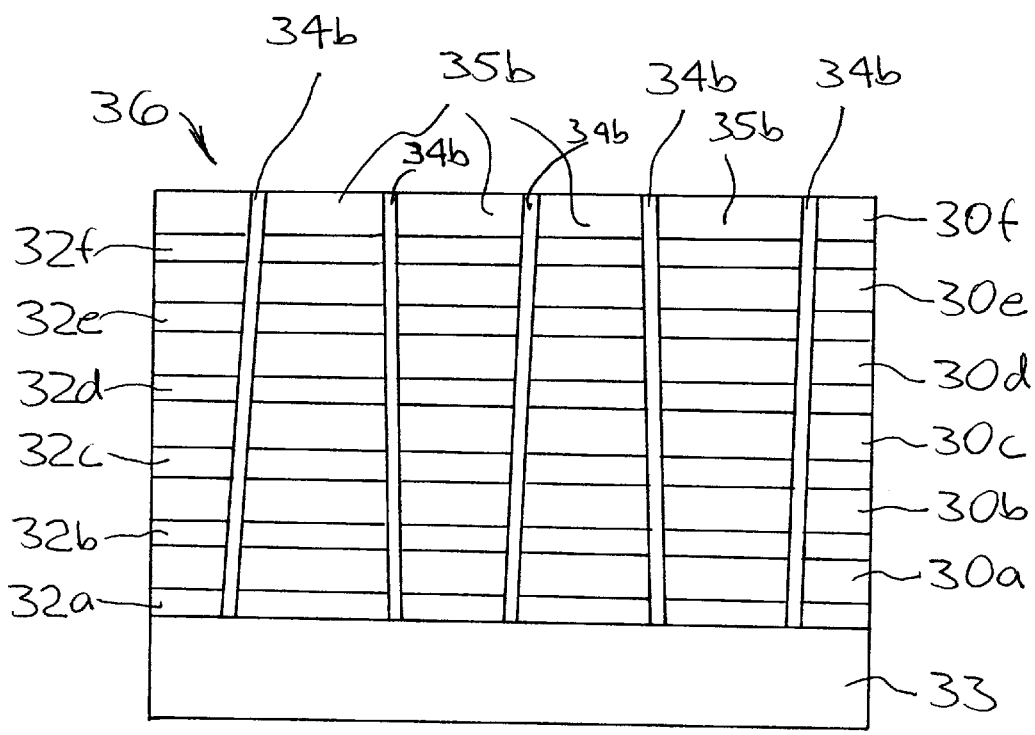
FIG. 3 is a partially schematic side sectional view of a hard magnetic recording multilayer structure including alternating magnetic layers and spacer layers that have been exchange decoupled throughout the entire thickness of the structure. In accordance with the present invention, an oxygen diffusion process causes column boundary oxidation, which produces granular magnetic columns extending through the thickness of the film.

An example of an exchange decoupled multilayer structure 36 of the present invention is illustrated in FIG. 3. The multilayer structure 36 comprises alternating layers of magnetic material 30a–30f and spacer material 32a–32f. In accordance with the present invention, substantially all of the magnetic layers 30a–30f and spacer layers 32a–32f are exchange decoupled by grain boundary regions 34b which extend through the alternating layers. The boundary regions 34b define decoupled granular columns 35b, which extend from the upper surface of the structure 36 to the substrate 33. The grain boundary regions 34b thus effectively exchange decouple the spacers layers 32a–32f, as well as the magnetic layers 30a–30f, throughout the thickness of the multilayer structure 36.

Each magnetic layer 30a–30f typically has a thickness of from about 0.3 to about 10 nm. Each spacer layer 32a–32f may have a thickness of from about 0.3 to about 20 nm. The granular columns 35b typically have substantially equiaxed cross sections having diameters of from about 1 to about 100 nm. The grain boundary region 34b may have a thickness of from about 0.3 to about 2 nm.

Although the multilayer structure shown in FIG. 3 comprises six (6) magnetic layers 30a–30f and six (6) spacer layers 32a–32f, any suitable number of layers may be used. For example, the multilayer structure may include from two (2) to forty (40) layers of each of the magnetic material and spacer material.

The magnetic layers 30a–30f may comprise at least one metal selected from Co, Ni and Fe, with Co being an example of a magnetic material. The spacer layers 32a–32f may comprise at least one metal selected from Pd, Pt and Au, with Pd and Pt being particularly suitable spacer materials. Additives in total amounts of from about 0.001 to about 30 weight percent may be added to the magnetic and spacer layers. The additives which may be added to the magnetic and spacer layers may include Cr, Pt, B, Ta, Nb, Y, La, rare earth elements and $SiO_2$. Typical additives include Cr, Pt, B, Ta, Nb and combinations thereof. The microstructure of the structure 36 thus comprises multilayer grains of the magnetic and spacer materials at least partially surrounded by lower density regions containing relatively large amounts of the additive(s), e.g., B-rich regions, Cr-rich regions, $SiO_2$-rich regions, etc. The addition of fast oxidants such as boron to the multilayer structure aids oxidation and makes the aging process substantially faster.

In addition to promoting exchange decoupling, the additives may also act as grain refiners for the magnetic and spacer layers. The magnetic and spacer layers 30a–30f and 32a–32f may have an average grain size of less than about 20 nm. Typical average grain sizes of the magnetic and spacer layers 30a–30f and 32a–32f range from about 3 to about 12 nm.

Examples of particularly suitable multilayer structures include (CoB/PdB)xN and (CoCrB/PdCrB)xN, where B and Cr are low percentage additives and N may range from 1 to 40, for example, from 1 to 30. Each spacer layer may comprise a monolithic material such as Pd plus additive(s), or may alternatively comprise a structured material such as Pd/Pt/Pd. Each spacer layer may comprise the same composition and thickness. Alternatively, different spacer layer compositions and/or thicknesses may be used. Similarly, the compositions and thicknesses of the magnetic layers may be the same or different.

The magnetic and spacer layers may be deposited by techniques such as sputtering, evaporation or molecular beam epitaxy (MBE). Deposition may be carried out, for instance, at room temperature or at elevated temperatures of, e.g., from about 150 to about 250° C. For example, the alternating layers of the magnetic material 30a–32f and spacer material 32a–32f shown in FIGS. 2 and 3 may be deposited by sputtering the desired number of atomic layer (s) of each material onto a rotating substrate. Commercially available dc or rf magnetron sputtering systems utilizing sputtering targets in a variety of shapes and sizes and Ar, Kr and/or Xe inert sputtering gas may be suitable for fabricating such multilayers.

In accordance with the present invention, after the multilayers have been deposited, the structure is treated in an oxygen-containing atmosphere. During the oxygen treatment process, the grain boundaries may be preferentially oxidized in order to significantly improve exchange decoupling. The oxygen-containing atmosphere may comprise air or any other oxygen-containing medium. For example, an atmosphere comprising an inert gas such as argon and from 1 to 20 percent oxygen may be used. The oxidation process may be carried out at atmospheric pressure or at elevated pressures.

In order to accelerate the oxygen diffusion process, the magnetic and spacer layers may be heated. Typical heating operations may be carried out at temperatures of from about 50 to about 350° C. or higher, for times of from about 1 minute to about 100 hours or more depending on the type of material and thickness of the structure. However, the heating process should be performed at a temperature below which unwanted diffusion between the multilayers occurs.

In a typical fabrication process, the complete media structure is deposited excluding the overcoat layer. It is then annealed in an oxygen-rich environment to accelerate the process. As long as the annealing temperature is substantially below the temperature at which diffusion can destroy the multilayer structure, the annealing process will improve the properties of the recording layer. Finally, a protective overcoat such as C:Hx is deposited followed by a standard lubrication film. The annealing process produces completely decoupled magnetic columns, as illustrated in FIG. 3. The present annealing process in an oxygen-rich environment can be applied to any recording layer system, such as CoCr-alloy based recording layers, to promote exchange decoupling of the magnetic grains/columns.

Figure 4:
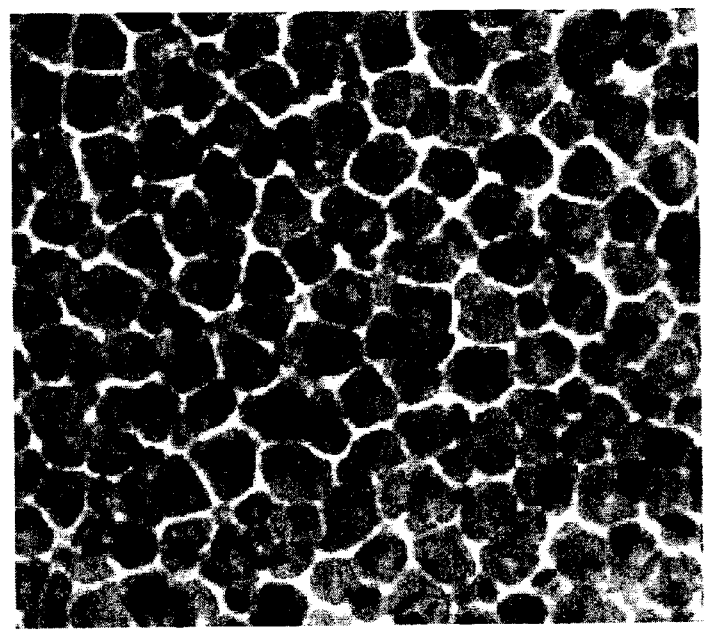
FIG. 4 is a transmission electron micrograph of the surface of a CoB/Pd multilayer film, illustrating multigranular columns at the surface of the material surrounded by lower density material between the columns.
Figure 5:
FIG. 5 is a transmission electron micrograph of a cross section of the CoB/Pd multilayer film shown in FIG. 4, illustrating that the columnar structure of the deposited layers only extends partially from the surface of the film.

FIG. 4 shows a TEM surface view and FIG. 5 shows a TEM cross-sectional view of a CoB/Pd multilayer film in the as-deposited condition, before the oxygen treatment of the present invention. The multilayer film was made by depositing thirty (30) bilayers of CoB (0.3 nm thick) and Pd (1.4 nm thick) on an indium tin oxide (ITO) buffer layer (5 nm thick). Deposition of the bilayers was achieved by conventional magnetron sputtering techniques in a 30 mTorr argon atmosphere.

It can be seen from FIGS. 4 and 5 that the film has a partial columnar structure, with each column including several grains. The granular columns are shown as dark regions in FIGS. 4 and 5. The lighter regions around the columns are regions with lower density material that aid in magnetic decoupling of the columns. As deposited, the lower density material extends to about two-thirds of the column height, as shown in FIG. 5. However, the bottom of the columns are strongly magnetically coupled which is manifested in poor recording performance in as-deposited discs. For example, the signal-to-noise ratio at recording density of 1 bit per PW50 for the multilayer film shown in FIGS. 4 and 5 is only 14 dB versus about 21 dB at equivalent density for longitudinal media or CoCr-alloy based perpendicular media.

A perpendicular magnetic recording medium including a hard magnetic recording film comprising a columnar microstructure in accordance with the present invention is made as follows. A glass substrate in the form of a standard magnetic recording glass disc is coated with a 5 nm layer of Ta, a 0.3 micron layer of $Ni_{45}Fe_{55}$, and a 2 nm layer of Ta. A 0.1 micron thick soft magnetic underlayer of FeAlN is then deposited on the Ta layer, followed by a 5 nm thick layer of ITO. A hard magnetic recording film comprising thirty (30) bilayers of CoB/Pd, as described above and shown in FIGS. 4 and 5, is then deposited on the ITO layer. The structure is then aged in air at room temperature and atmospheric pressure for 180 days. After treatment in the oxygen-containing atmosphere, the resultant multilayer structure comprising granular columns is coated with a 5 nm thick $C:H_x$ protective layer. The media is then tested to determine its signal-to-noise ratio. The signal-to-noise ratio increases by 5 dB to 19 dB as a result of the oxygen treatment process, leading to a significant improvement in media performance. Although not intending to be bound by any particular theory, the underlying effect is believed to be oxygen and possibly moisture diffusion through lower density boundary regions surrounding the granular magnetic columns to the bottom region of the columns and subsequent oxidation of the thin bridges responsible for magnetic or exchange coupling.

Whereas particular embodiments of this invention have been described above for purposes of illustration, it will be evident to those skilled in the art that numerous variations of the details of the present invention may be made without departing from the invention as defined in the appended claims.

What is claimed is:

1. A magnetic recording media comprising:
 a substrate; and
 a hard magnetic recording film on the substrate comprising alternating layers of magnetic material and spacer material, wherein the magnetic material and spacer material comprise a microstructure including granular columns separated by oxidized boundary layers, and the granular columns extend in a substantially perpendicular direction through the magnetic and spacer layers.

2. The magnetic recording media of claim 1, wherein the granular columns extend through all of the magnetic and spacer layers.

3. The magnetic recording media of claim 1, wherein the granular columns have substantially equiaxed cross sections.

4. The magnetic recording media of claim 3, wherein the granular columns have cross sectional diameters of from about 1 to about 100 nm.

5. The magnetic recording media of claim 1, wherein the oxidized boundary layers have thicknesses of from about 0.3 to about 2 nm.

6. The magnetic recording media of claim 1, wherein the oxidized boundary layers comprise an oxide of at least one metal selected from Cr, B, Ta, Nb, Y, La and rare earth elements.

7. The magnetic recording media of claim 1, wherein the oxidized boundary layers comprise an oxide of at least one metal selected from Cr and B.

8. The magnetic recording media of claim 1, wherein the oxidized boundary layers comprise boron oxide.

9. The magnetic recording media of claim 1, wherein the magnetic layers comprise at least one metal selected from Co, Ni and Fe.

10. The magnetic recording media of claim 1, wherein the magnetic layers comprise Co.

11. The magnetic recording media of claim 1, wherein the spacer layers comprise at least one metal selected from Pd, Pt and Au.

12. The magnetic recording media of claim 1, wherein the spacer layers comprise Pd.

13. The magnetic recording media of claim 1, wherein the magnetic and/or spacer layers comprise at least one additive selected from Cr, Pt, B, Ta, Nb, Y, La, rare earth elements and $SiO_2$.

14. The magnetic recording media of claim 1, wherein the magnetic layers comprise at least one metal selected from Co, Ni and Fe, the spacer layers comprise at least one metal selected from Pd and Pt, and the magnetic and spacer layers further comprise at least one additive selected from Cr, Pt, B, Ta, Nb, Y, La, rare earth elements and $SiO_2$.

15. The magnetic recording media of claim 14, wherein the magnetic layers comprise Co, the spacer layers comprise Pd, and the additives comprise at least one element selected from Cr and B.

16. The magnetic recording media of claim 15, wherein the additives are the same in both the magnetic layers and spacer layers.

17. The magnetic recording media of claim 1, wherein the magnetic and spacer layers have average grain sizes of less than about 20 nm.

18. The magnetic recording media of claim 1, wherein the spacer layers have average grain sizes of from about 1 to about 10 nm.

19. The magnetic recording media of claim 1, wherein the hard magnetic recording layer comprises from 2 to 30 layers of each of the magnetic material and spacer material.

20. The magnetic recording media of claim 1, wherein each magnetic layer has a thickness of from about 0.3 to about 10 nm, and each spacer layer has a thickness of from about 0.3 to about 20 nm.

21. The magnetic recording media of claim 1, further comprising a soft magnetic layer between the substrate and the hard magnetic recording layer.

22. The magnetic recording media of claim 1, wherein the magnetic recording media is a perpendicular magnetic recording media.

23. An exchange decoupled magnetic recording film comprising alternating layers of magnetic material and spacer material, wherein the magnetic material and spacer material comprise a microstructure including granular columns separated by oxidized boundary layers, and the columnar microstructure extends in a substantially perpendicular direction through the magnetic and spacer layers.

24. The exchange decoupled magnetic recording film of claim 23, wherein the granular columns extend through all of the magnetic and spacer layers.

25. The exchange decoupled magnetic recording film of claim 23, wherein all of the layers of magnetic material and spacer material are exchange decoupled.

26. A magnetic recording media comprising:
a substrate; and
a hard magnetic recording film of the substrate comprising alternating layers of magnetic material and spacer material, wherein the magnetic material and spacer material comprise a microstructure including granular columns separated by oxidized boundary layers, and the granular columns extend through all of the magnetic and spacer layers.

27. A magnetic recording media comprising:
a substrate; and
a hard magnetic recording film on the substrate comprising alternating layers of magnetic material and spacer material, wherein the magnetic material and spacer material comprise a microstructure including granular columns separated by oxidized boundary layers, and the granular columns have substantially equiaxed cross sections.

28. A magnetic recording media comprising:
a substrate; and
a hard magnetic recording film on the substrate comprising alternating layers of magnetic material and spacer material, wherein the magnetic material and spacer material comprise a microstructure including granular columns separated by oxidized boundry layers having thicknesses of from about 0.3 to about 2 nm.

29. A magnetic recording media comprising:
a substrate; and
a hard magnetic recording film on the substrate comprising alternating layers of magnetic material and spacer material, wherein the magnetic material and spacer material comprise a microstructure including granular columns separated by oxidized boundary layers comprising an oxide of at least one metal selected from Cr, B, Ta, Nb, Y, La and rare earth elements.

30. A magnetic recording media comprising:
a substrate; and
a hard magnetic recording film on the substrate comprising alternating layers of magnetic material and spacer material, wherein the magnetic material and spacer material comprise a microstructure including granular columns separated by oxidized boundary layers, and the spacer layers comprise at least one metal selected from Pd, Pt and Au.

31. A magnetic recording media comprising:
a substrate; and
a hard magnetic recording film on the substrate comprising alternating layers of magnetic material and spacer material, wherein the magnetic material and spacer material comprise a microstructure including granular columns separated by oxidized boundary layers, and the magnetic layers comprise at least one metal selected from Co, Ni and Fe, the spacer layers comprise at least one metal selected from Pd and Pt, and the magnetic and spacer layers further comprise at least one additive selected from Cr, Pt, B, Ta, Nb, Y, La, rare earth elements and $SiO_2$.

32. A magnetic recording media comprising:
a substrate; and
a hard magnetic recording film of the substrate comprising alternating layers of magnetic material and spacer material, wherein the magnetic material and spacer material comprise a microsstructure including granular columns separated by oxidized boundary layers, and the magnetic and spacer layers have average grain sizes of less than about 20 nm.

33. A magnetic recording media comprising:
a substrate; and
a hard magnetic recording film on the substrate comprising alternating layers of magnetic material and spacer material, wherein the magnetic material and spacer material comprise a micrstructure including granular columns separated by oxidized boundary layers, and the hard magnetic recording film comprises from 2 to 30 layers of each of the magnetic material and spacer material.

34. A magnetic recording media comprising:
a substrate;
a hard magnetic recording film on the substrate comprising alternating layers of magnetic material and spacer material, wherein the magnetic material and spacer material comprise a microstructure including granular columns separated by oxidized boundary layers; and a soft magnetic layer between the substrate and the hard magnetic recording layer.

35. A magnetic recording media comprising:

a substrate; and a hard magnetic recording film on the substrate comprising alternating layers of magnetic material and spacer material, wherein the magnetic material and spacer material comprise a microstructure including granular columns separated by oxidized boundary layers, and the magnetic recording media is a perpendicular magnetic recording media.

36. An exchange decoupled magnetic recording film comprising alternating layers of magnetic material and spacer material, wherein the magnetic material and spacer material comprise a microstructure including granular columns separated by oxidized boundary layers, and all of the layers of magnetic material and spacer material are exchange decoupled.

* * * * *

UNITED STATES PATENT AND TRADEMARK OFFICE
CERTIFICATE OF CORRECTION

PATENT NO. : 6,656,613 B2
DATED : December 2, 2003
INVENTOR(S) : Dmitri Litvinov et al.

It is certified that error appears in the above-identified patent and that said Letters Patent is hereby corrected as shown below:

<u>Column 7,</u>
Line 16, "claim 15" should read -- claim 14 --.

<u>Column 8,</u>
Line 48, "microsstructure" should read -- microstructure --.
Line 58, "micrstructure" should read -- microstructure --.

Signed and Sealed this

Thirteenth Day of July, 2004

JON W. DUDAS
*Acting Director of the United States Patent and Trademark Office*